United States Patent
Sato

[11] Patent Number: 5,631,780
[45] Date of Patent: May 20, 1997

[54] WIDE-ANGLE LENS

[75] Inventor: Haruo Sato, Kawasaki, Japan

[73] Assignee: Nikon Corporation, Tokyo, Japan

[21] Appl. No.: 275,417

[22] Filed: Jul. 15, 1994

[30] Foreign Application Priority Data

Jul. 23, 1993 [JP] Japan ................... 5-202784

[51] Int. Cl.$^6$ .................................... G02B 13/04
[52] U.S. Cl. .................. 359/749; 359/708; 359/770
[58] Field of Search ........................ 359/749, 750, 359/751, 752, 684, 691, 755, 756, 761, 708, 770

[56] References Cited

U.S. PATENT DOCUMENTS

| | | | |
|---|---|---|---|
| 4,029,397 | 6/1977 | Yamashita | 350/214 |
| 4,776,680 | 10/1988 | Tanaka | 350/427 |
| 4,806,003 | 2/1989 | Mukai et al. | 350/459 |
| 5,325,236 | 6/1994 | Tanaka | 359/689 |

FOREIGN PATENT DOCUMENTS

| | | |
|---|---|---|
| 49-121527 | 11/1974 | Japan . |
| 63-61213 | 3/1988 | Japan . |
| 1-134411 | 5/1989 | Japan . |
| 4-191715 | 7/1992 | Japan . |

*Primary Examiner*—Georgia Y. Epps
*Assistant Examiner*—Dawn-Marie Bey

[57] ABSTRACT

A retrofocus type wide-angle lens for achieving a highly stable imaging performance and a reduction in spherical aberrations, astigmatism, and coma, while allowing for a large aperture and a large wide angle of view. The retrofocus type wide-angle lens has, in the following order from an object side, a first lens group having a negative refracting power and being fixed in a focusing operation and a second lens group having a positive refracting power and being moved in the focusing operation. The first lens group has, in the following order from the object side, a first unit with a negative refracting power and a second unit having a positive refracting power. The second lens group has, in the following order from the object side, a first unit with a negative refracting power, a second unit with a positive refracting power, a third unit with a negative refracting power and a fourth unit with a positive refracting power. The third unit of the second lens group having a cemented lens formed of a lens with a negative refracting power and a lens with a positive refracting power, the cemented lens constituting a negative meniscus lens with a convex surface directed to an image side.

23 Claims, 6 Drawing Sheets

1
WIDE-ANGLE LENS

BACKGROUND OF THE INVENTION

1. Field of the Invention

The present invention relates to a wide-angle lens and more particularly to a retrofocus type wide-angle lens with a large aperture in which a rear lens group is moved in the focusing operation.

2. Related Background Art

There are retrofocus types of wide-angle lenses. In general, a focusing system for retrofocus type wide-angle lenses, includes a rear focus type or an inner focus type in which a few lenses are moved in the focusing operation to improve close distance focusing performance and operation. Various retrofocus wide-angle lenses have been proposed, e.g., U.S. Pat. Nos. 4,029,397 and 4,806,003 and Japanese Patent Application Laid-Open Nos. 4-191715 and 1-134411.

In the retrofocus type wide-angle lens disclosed in U.S. Pat. No. 4,029,397, a first lens group has a positive lens and a negative lens in that order from the object side. A second lens group basically has a power (refracting power) arrangement of the retrofocus type wide-angle lens. A master section (a rear lens group having a positive refracting power) of the second lens group is in the form of a modified Triplet. As the focusing system, a rear focusing system is adopted in which the second lens group is moved in the focusing operation while the first lens group is fixed.

In this retrofocus type wide-angle lens with the rear focusing system, the first lens group has the positive lens and the negative lens arranged in that order from the object side, i.e., takes the positive lens preceding form. Therefore, principal rays of marginal pencils of rays pass at positions far from the optical axis in an object-side lens surface of the retrofocus type wide-angle lens located closest to the object side. As a result, the diameters of the front lenses are enlarged and the lateral chromatic aberration as well as the distortion in the peripheral area are increased, which is disadvantageous in terms of performance and miniaturization.

Further, because the structure of the master lens section (the rear lens group having the positive refracting power) of the second lens group is a modified Triplet type (or a tele-sonnar type) the same as in general retrofocus type wide-angle lenses, it is difficult to make the aperture large.

In the retrofocus type wide-angle lens disclosed in Japanese Patent Application Laid-Open No. 4-191715, although a first lens group has a negative lens and a positive lens arranged in that order from the object side, i.e., takes the negative lens preceding form, the first lens group has a positive refracting power as a whole. Therefore, it is difficult to make an angle of view of wide-angle lens larger, and the size of the wide-angle lens is likely to be enlarged. Also, the structure of the master section (the rear lens group having a positive refracting power) of a second lens group is a modified Triplet type, the same as in the above gazette, so it is difficult to make the aperture large.

Further, in the retrofocus type wide-angle lens disclosed in U.S. Pat. No. 4,806,003, the lens system consists of three lens groups having negative, positive and positive refracting powers in that order from the object side, and the rear two lens groups are moved by respectively different amounts in the focusing operation. Basically, the first lens group with the negative refracting power constitutes a wide converter and the second and third lens groups with the positive refracting powers constitute a Gauss type high speed lens.

2

Thus, the second and third lens groups constitute the Gauss type high speed lens, whose structure is advantageous to make the aperture large. However, in order to keep a sufficient back focus and to obtain a wider angle as a retrofocus wide-angle lens by this structure, there is no other way but for the refracting power of the first lens group to be made considerably large. In such a case, imaging performance is deteriorated and the size of the wide-angle lens is enlarged.

Furthermore, in the retrofocus type wide-angle lens disclosed in Japanese Patent Application Laid-Open No. 1-134411, the lens system consists of three lens groups having negative, positive and positive refracting powers in that order from the object side and the second lens group with the positive refracting power is moved in the focusing operation. Basically, the first lens group with the negative refracting power constitutes a wide converter and the second lens group with the positive refracting power constitutes a retrofocus type wide-angle lens. And, the third lens group constitutes a modified Gauss type lens.

Accordingly, the above structure is effective to obtain a large aperture and a large angle of view. However, despite the fact that the above structured wide-angle lens is big in size and has a large number of lenses, aberrations are not corrected sufficiently. In particular, the corrections of the coma and the lateral chromatic aberration are not performed sufficiently. Also, in manufacture, it is difficult to highly stabilize the sensitivity of the decentration of each lens element.

SUMMARY OF THE INVENTION

It is an object of the present invention to provide retrofocus type wide-angle lens which adopts the rear focus system and has a large aperture and a large wide angle of view and in which highly stable imaging performance can be achieved in an entire focusing area from a closest distance to infinity and in particular, in which the changes of the spherical aberration, astigmatism and coma are small.

In order to achieve the above object, a retrofocus type wide-angle lens according to one aspect of the present invention comprises, in the following order from an object side, a first lens group having a negative refracting power and being fixed in a focusing operation and a second lens group having a positive refracting power and being moved in the focusing operation, the first lens group comprising, in the following order from the object side, a first unit with a negative refracting power and a second unit having a positive refracting power, the second lens group comprising, in the following order from the object side, a first unit with a negative refracting power, a second unit with a positive refracting power, a third unit with a negative refracting power and a fourth unit with a positive refracting power, the third unit of the second lens group having a cemented lens formed of a lens with a negative refracting power and a lens with a positive refracting power, the cemented lens forming a negative meniscus lens with a convex surface directed to an image side, wherein the following condition is satisfied:

$$2 \leq -f1/f0 \leq 9,$$

wherein f1: a focal length of the first lens group f0: a focal length of the entire lens system.

Also, a retrofocus type wide-angle lens according to another aspect of the present invention comprises, in the following order from an object side, a first lens group having a negative refracting power and being fixed in a focusing operation and a second lens group having a positive refracting power and being moved in the focusing operation, the first lens group having, in the following order from the object side, a first unit with a negative refracting power and a second unit with a positive refracting power, the second lens group having, in the following order from the object side, a first unit with a negative refracting power, a second unit with a positive refracting power, a third unit with a negative refracting power and a fourth unit with a positive refracting power, the third unit of the second lens group having a cemented lens formed of a lens with a negative refracting power and a lens with a positive refracting power, the cemented lens forming a negative meniscus lens with a convex surface directed to an image side, wherein the following condition is satisfied:

$$0 < f2B/f2A < 0.9,$$

wherein f2A: a composite focal length of the first unit of the second lens group and the second unit of the second lens group f2B: a composite focal length of the third unit of the second lens group and the fourth unit of the second lens group.

Further, a retrofocus type wide-angle lens according to a still another aspect of the present invention comprises, in the following order from an object side, a first lens group having a negative refracting power and being fixed in a focusing operation and a second lens group having a positive refracting power and being moved in the focusing operation, the first lens group having a plurality of lenses, the second lens group having an aperture diaphragm and a plurality of lenses, at least one of plural lens surfaces located on the object side with respect to the aperture diaphragm being aspherical, at least one of plural lens surfaces located on the image side with respect to the aperture diaphragm being aspherical.

A well known method of rear and inner focusing for retrofocus type wide-angle lenses includes moving a portion or the whole of a master section (the rear lens group having a positive refracting power) of a retrofocus type wide-angle lens in the focusing operation in the optical axis direction. Another method including adding a wide converter in front of a retrofocus type wide-angle lens; and, while the wide converter is fixed, the retrofocus type wide-angle lens is integrally moved in the optical axis direction. That is, the wide converter section constitutes the front lens group of the whole system and the original retrofocus type wide-angle lens constitutes the rear lens group of the whole system. Then, while the front lens group of the whole system is fixed, the rear lens group (the original retrofocus type wide-angle lens) of the whole system is moved in the focusing operation in the optical axis direction.

The former method is advantageous to form the having group small, but the changes of aberrations in the focusing operation are large as compared to the latter method. Therefore, the latter method is advantageous to obtain a large aperture and a large angle of view.

The structure of the retrofocus type wide-angle lens of the present invention will be described now.

FIG. 1 is a schematic diagram for explaining the operation principle of the present invention. As shown in FIG. 1, in a retrofocus type wide-angle lens of the present invention, a first lens group G1 constitutes a wide converter as mentioned above. On the other hand, a second lens group G2 is a master section of the whole system of the wide-angle lens and has a positive refracting power as a whole, and it has a first unit G21 with a negative refracting power disposed closest to the object side and has a power arrangement of the retrofocus type wide-angle lens.

If the second lens group G2 (the master section of the whole lens system of the retrofocus type wide-angle lens) does not have the power arrangement of the wide-angle lens but rather the shape and power arrangement of a Gauss type, a Xenotar type or a modified Triplet type, then the first lens group G1 must have a power necessary to keep a sufficient back focus and to obtain a large angle of view. Therefore, deterioration of the off-axis aberrations and deterioration of imaging performance due to the change within a close distance in the focusing operation occur and the diameters of the front lenses are increased to cause the retrofocus type wide-angle lens to be enlarged in size, so that it is difficult to obtain a wide angle of view.

Therefore, in order to make the diameters of the front lenses small with respect to enhancement of the angle of view and to perform corrections of the off-axis aberrations preferably, the first lens group G1 of the present invention consists of a first unit G11 with a negative refracting power and a second unit G12 with a positive refracting power in that order from the object side. That is, it takes the power arrangement of the negative lens preceding type. When a positive lens element having a positive refracting power is arranged in the first lens group G1, it is possible to correct the distortion produced by a negative lens element with a negative refracting power in the first lens group G1. However, in that case, there occurs a contradictory fact that the refracting power of the negative lens element of the first lens group G1 is made larger to cause the negative distortion to be increased. Therefore, the positive refracting power is preferably set to be small.

Further, the larger the angle of view is made, the larger the effect of correcting the negative distortion by the positive lens element becomes, so that the correction is performed excessively in the vicinity of the periphery of the angle of view. Accordingly, the large distortion occurs so as to be shifted largely to the negative side in the middle portion of the angle of view and so as to be shifted largely to the positive side in the vicinity of the periphery of the angle of view. This phenomenon occurs similarly in the correcting condition of the lateral chromatic aberration.

Therefore, in the diverging type front lens group of the negative lens preceding type as compared to that of the positive lens preceding type, there is an effect that the angles of light rays incident on the positive lens in the lens group are reduced by the negative lens positioned in front of the positive lens. Accordingly, the above-mentioned phenomena of the distortion and lateral chromatic aberration are reduced. Further, the power of the positive lens in the lens group can be decreased by reducing the angle of incidence, so that the above phenomena occurring in the correcting conditions of the distortion and transverse chromatic aberration can be reduced more preferably.

Thus, the negative lens preceding type rather than the positive lens preceding type is more advantageous to form a retrofocus type wide-angle lens with a large angle of view. In particular, in the retrofocus type wide-angle lens of the present invention having a large aperture and a large angle of view, it is necessary to take the negative preceding type so as to make the diameters of the front lenses small and so as to improve imaging performance in the peripheral area of the angle of view.

Further, in the present invention, in order to obtain a much larger aperture, a modified Gauss type is utilized for the master section (a second unit G22 to a fourth unit G24) of the second lens group G2. Usually, master sections of retrofocus type wide-angle lenses constitute modified Triplet types or tele-Sonnar types. However, the modified Triplet type and the tele-Sonnar type have defects that a negative lens with a strong negative refracting power positioned in the center of the lens system makes it difficult to correct the upper coma and the field curvature and causes the higher-order spherical aberration in accordance with enhancement of the aperture. Therefore, for enhancement of the aperture, it is more preferable to adopt the Gauss type in which a negative power is divided by an interposed aperture diaphragm instead of the above negative lens with the strong power.

From the above viewpoint, a rear lens group G2B (the third unit G23 of the second lens group G2 and the fourth unit G24 of the second lens group G2) of the second lens group G2 constitutes the rear unit of Gauss type by the third unit G23 consisting of a cemented lens of a lens with a negative refracting power and a lens with a positive refracting power and as a whole, constituting a negative meniscus lens with a convex surface directed to the image side and the fourth unit G24 of the second lens group with a positive refracting power. Thereby, the upper coma, the field curvature and the spherical aberration are corrected effectively. In particular, by forming the third unit of the second lens group so as to be the cemented lens, it is possible to correct the spherical aberration and the chromatic aberration preferably and to limit occurrence of the higher-order aberrations.

Next, the conditions of the present invention will be described.

The lens of the present invention preferably satisfies the following conditions:

$$2 \le -f1/f0 \le 9 \tag{1}$$

$$0 < f2B/f2A < 0.9, \tag{2}$$

wherein f1: the focal length of the first lens group G1 f0: the focal length of the entire lens system of the retrofocus type wide-angle lens f2A: the composite focal length of the first unit G21 of the second lens group and the second unit G22 of the second lens group (the composite focal length of the front lens group G2A of the second lens group)

f2B: the composite focal length of the third unit G23 of the second lens group and the fourth unit G24 of the second lens group (the composite focal length of the rear lens group G2B of the second lens group).

The condition (1) defines a proper range regarding the refracting power of the first lens group G1.

When the lower limit of the condition (1) is violated, the power of the first lens group G1 becomes too large, making it impossible to correct the distortion and the lateral chromatic aberration. As a result, the number of lenses are increased for the corrections. Also, the change within a close distance in the focusing operation is increased. When the lower limit is set to 4.3 or more, more preferable imaging performance can be achieved while the number of lenses is decreased much more.

On the other hand, when the upper limit of the condition (1) is violated, the power of the first lens group G1 becomes too small, so the diameters of the front lenses are large and enough back focus cannot be obtained. When the upper limit is set to 6.5 or less, it is possible to realize a much compacter retrofocus type wide-angle lens.

The condition (2) defines a proper range regarding the power ratio of the front lens group G2A of the second lens group G2 (the first unit G21 of the second lens group and the second unit G22 of the second lens group) to the rear lens group G2B (the third unit G23 of the second lens group and the fourth unit G24 of the second lens group).

The lower limit of the condition (2) indicates that as the power of the front lens group G2A becomes zero, the whole lens system becomes enlarged.

On the other hand, when the upper limit of the condition (2) is violated, the positive power of the front lens group G2A becomes considerably larger than that of the rear lens group G2B, so that correction of the spherical aberration which is important to obtain a larger aperture is deteriorated and enough back focus cannot be obtained. When the lower limit is set to 0.2 or more and the upper limit is set to 0.66 or less, more preferable imaging performance can be achieved.

In order to achieve further preferable imaging performance, the second unit G22 of the second lens group has a biconvex lens and a negative lens. In addition to the above conditions, it is preferable to satisfy the following condition:

$$3 \le -f1/f2 \le 9 \tag{3}$$

$$0.3 \le f_p/f2 \le 1.2, \tag{4}$$

wherein f1: the focal length of the first lens group G1 f2: the focal length of the second lens group G2

$f_p$: the focal length of the biconvex lens of the second unit G22 of the second lens group.

The condition (3) defines a proper range regarding the power ratio of the first lens group G1 to the second lens group G2.

When the lower limit of the condition (3) is violated, the power of the first lens group becomes large which leads to deterioration of imaging performance and increase of the number of lenses due to the same reason as in the case that the lower limit of the condition (1) is violated. When the lower limit is set to 3.2 or more, the effect of the present invention is obtained with a much smaller number of lenses.

On the other hand, when the upper limit of the condition (3) is violated, the power of the second lens group G2 becomes large. Therefore, the correction of the spherical aberration becomes difficult, so it is impossible to realize a large aperture. Also, enough back focus cannot be obtained. When the upper limit is set to 8 or less, further preferable imaging performance can be achieved.

The condition (4) defines a proper range regarding the power of the biconvex lens of the second unit G22 of the second lens group. The shape and power of the biconvex lens is relevant to the correction of the spherical aberration and the correction of the sagittal coma flare which becomes a problem especially in the high speed lens. When the power of the biconvex lens is set to a proper power, i.e., a comparatively larger power, a negative higher-order spherical aberration is produced, making it possible to preferably perform correction of the spherical aberration. Also, it is possible to correct the sagittal coma flare in a strong convergent surface.

Therefore, when the lower limit of the condition (4) is violated, the power of the biconvex lens becomes too large. As a result, a large negative higher-order spherical aberration occurs and the sensitivity of the decentration becomes considerably high, so that it becomes difficult to manufacture the lens. When the lower limit is set to 0.6 or more, further preferable imaging performance can be obtained.

On the other hand, when the upper limit of the condition (4) is violated, there is a disadvantage in that the effects of the corrections of the spherical aberration and the sagittal coma flare are reduced.

In order to further improve imaging performance, it is preferable to introduce an aspherical surface in the rear lens group G2B of the second lens group G2 (the third unit G23 of the second lens group and the fourth unit G24 of the second lens group). The aspherical surface is introduced so as to correct the spherical aberration, the upper coma and the sagittal coma flare.

The shape of the aspherical surface is determined such that a positive refracting power is reduced from the center of the lens toward the periphery thereof or a negative refracting power is increased from the center of the lens toward the periphery thereof, and it is preferable to satisfy the following condition:

$$0 < |AS_I - S_I|/f0 < 0.15, \qquad (5)$$

wherein $|AS_I - S_I|$: the amount of sag of the aspherical surface of the aspherical lens introduced in the rear lens group G2B of the second lens group G2 f0: the focal length of the whole lens system.

The amount of sag is a difference along the optical axis direction between an aspherical surface distance $AS_I$ of an outermost periphery of effective diameters of an aspherical surface and a reference spherical surface distance S1 of a reference spherical surface whose apex has a predetermined curvature radius. Here, the aspherical surface distance AS1 and the reference spherical surface distance S1 are so defined to be the respective distances from a plane perpendicular to the optical axis at an intersecting point of an aspherical surface with the optical axis to the aspherical surface in the outermost periphery thereof and to a reference spherical surface.

The condition (5) defines a proper range regarding the amount of sag of the aspherical surface in the rear lens group G2B.

When the upper limit of the condition (5) is violated, its processing in the manufacture becomes difficult and the sensitivity of the eccentricity becomes considerably high.

Also, it is preferable to introduce an aspherical surface in the front lens group G2A of the second lens group G2 (the first unit G21 of the second lens group and the second unit G22 of the second lens group). By introducing the aspherical surface in the front lens group G2A of the second lens group G2, it is possible to correct the lower coma, the sagittal coma flare and the distortion. Also, further preferable imaging performance can be achieved by making the aspherical lens have the correcting effect within a close distance in the focusing operation. The amount of sag of the aspherical surface preferably satisfies the following condition:

$$0 < |AS_o - S_o|/f0 < 0.2, \qquad (6)$$

wherein $|AS_o - S_o|$ is the amount of sag of the aspherical surface introduced in the front lens group G2A of the second lens group G2.

When the upper limit of the condition (6) is violated, its processing in the manufacture becomes difficult due to the same reason as in the case that the upper limit of the condition (5) is violated. Also, the sensitivity of the decentration becomes considerably high.

Also, in order to obtain a retrofocus type high speed lens with preferable imaging performance, the first unit of the second lens group preferably has a negative lens disposed closest to the object side and the following conditions are preferably satisfied:

$$-8 \leq q_N \leq -1 \qquad (7)$$

$$0.1 \leq -f2_N/f2 \leq 5 \qquad (8)$$

$$0.01 \leq d1/(-f1) \leq 0.3, \qquad (9)$$

wherein $q_N$: a shape factor of the negative lens of the second lens group G2 disposed closest to the object side $f2_N$: the focal length of the negative lens of the second lens group G2 disposed closest to the object side d1: the distance from a lens surface of the first lens group located closest to the object side to a lens surface of the first lens group located closest to the image side on the optical axis.

The shape factor is given by:

$$q_N = (r_B + r_A)/(r_B - r_A), \qquad (10)$$

wherein $r_A$: the radius of curvature of a surface of said negative lens located on the object side $r_B$: the radius of curvature of a surface of said negative lens located on the image side.

The condition (7) defines a proper range of the shape of the negative lens disposed closest to the object side.

When the lower limit of the condition (7) is violated, the radius of curvature of each surface of the negative lens becomes considerably small, which causes deterioration of the off-axis aberrations such as the lower coma. Also, the space between the first lens group G1 and the second lens group G2 is reduced.

On the other hand, when the upper limit of the condition (7) is violated, the shape of the negative lens is changed from the plano-concave shape to the biconcave shape, resulting in deterioration of the field curvature and the lower coma the same as in the case that the lower limit is violated.

The condition (8) defines a proper range regarding the power of the negative lens of the second lens group G2 disposed closest to the object side.

When the lower limit of the condition (8) is violated, the power of the negative lens becomes considerably large, which causes the deterioration of the spherical aberration. Thereby, a large aperture cannot be obtained. On the other hand, when the upper limit of the condition (8) is violated, the power of the negative lens becomes considerably small, whereby the retrofocus type power arrangement of the second lens group is lost and enough back focus cannot be obtained.

The condition (9) defines a condition on the distance from the surface of the first lens group on the object side to the surface of the first lens group on the image side along the optical axis direction.

When the lower limit of the condition (9) is violated, the thickness of the first lens group G1 is reduced too much. Therefore, in the case of the negative lens preceding type, corrections of the distortion and lower coma become difficult. Also, marginal pencils of rays cannot enter, so it is impossible to obtain a large angle of view. On the other hand, when the upper limit of the condition (9) is violated, the whole lens system is enlarged.

In the present invention, when an aspherical lens is introduced in the first lens group G1, the distortion etc. can be corrected more preferably.

Also, when an aspherical lens is introduced in the second unit G22 of the second lens group, it is effective to correct the spherical aberration and the sagittal coma flare.

Further, if at least either the first lens group G1 or the second lens group G2 is formed so as to be shiftable in the direction perpendicular to the optical axis, i.e., a vibration reducing optical system is formed, then it is possible to prevent deterioration of an image owing to vibration of the hands.

Further, it is possible to provide the lens system with a so-called floating effect by varying the distance of an air space in the second lens group G2 in the optical axis direction in the focusing operation, whereby changes in aberrations within a close distance can be reduced. In the present invention, the distance of the air space between the front lens group G2A of the second lens group and the rear lens group G2B thereof or the distance of the air space in which the Rand rays (parallel rays from infinity) in the second lens group are approximately afocal is reduced in the focusing operation. The provision of the floating effect is advantageous to lens design and to improve performance.

As described above, although the object of the present invention can be achieved by specifying the structures of the respective lens groups and units of the retrofocus type wide-angle lens and satisfying the condition (1) or the condition (2), it can be achieved by another method. In the method, a retrofocus type wide-angle lens has a first lens group fixed in the focusing operation, a second lens group moved in the focusing operation and an aperture diaphragm provided in the second lens group. Further, one or more lens surfaces on the object side with respect to the aperture diaphragm are aspherical surfaces. Similarly, one or more lens surfaces on the image side with respect to the aperture diaphragm are aspherical surfaces too.

In order to reduce changes of the aberrations, the lens of the present invention with the large aperture and the large angle of view has the first lens group having the negative refracting power and being fixed in the focusing operation and the second lens group having the positive refracting power and being shifted in the focusing operation.

Further, the aspherical surface provided on the image side with respect to the aperture diaphragm contributes to corrections of the upper coma and sagittal coma flare and is advantageous to achieve a much wider angle. On the other hand, the aspherical surface provided on the object side with respect to the aperture diaphragm contributes to corrections of the lower coma, sagittal coma flare and distortion. The provision of these aspherical surfaces are advantageous to obtain a much wider angle as well as to correct the aberrations within a close distance in the focusing operation.

Also, in order to obtain a larger aperture, based on the above structures, the second lens group preferably has, from the following order from the object side, a first unit with a negative refracting power, a second unit with a positive refracting power, a third unit with a negative refracting power and a fourth unit with a positive refracting power. The reason is that the second to fourth units constitute the modified Gauss type lens, so it is advantageous to obtain a larger aperture.

Further, in order to obtain sufficient imaging performance from infinity to a closest distance, the shape of the aspherical surface provided on the image side with respect to the aperture diaphragm is determined such that a positive refracting power is reduced from the center of the lens toward the periphery thereof or a negative refracting power is increased from the center of the lens toward the periphery thereof and it is preferable that the conditions (5) and (6) are satisfied. Furthermore, in order to obtain sufficient imaging performance from infinity to a closest distance while achieving the miniaturization and the larger aperture, the conditions (1) and (2) are preferably satisfied.

DETAILED DESCRIPTION OF THE PREFERRED EMBODIMENTS

A preferred embodiment of a retrofocus type wide-angle lens of the present invention comprises, from the following order from the object side, a first lens group G1 having a negative refracting power and being fixed in a focusing operation and a second lens group G2 having a positive refracting power and being moved in the focusing operation. The first lens group G1 comprises, from the following order from the object side, a first unit G11 with a negative refracting power and a second unit G12 with a positive refracting power. The second lens group G2 comprises, in the following order from the object, a first unit G21 with a negative refracting power, a second unit G22 with a positive refracting power, a third unit G23 with a negative refracting power and a fourth unit G24 with a positive refracting power. The third unit G23 of the second lens group is a cemented lens formed of a lens with a negative refracting power and a lens with a positive refracting power and has, as a whole, a negative meniscus lens with a convex surface directed to the image side. An aperture diaphragm is provided in the second lens group G2.

Preferred embodiments of the present invention will be described hereinafter with reference to the accompanying drawings.

Preferred Embodiment 1

Figure 1:
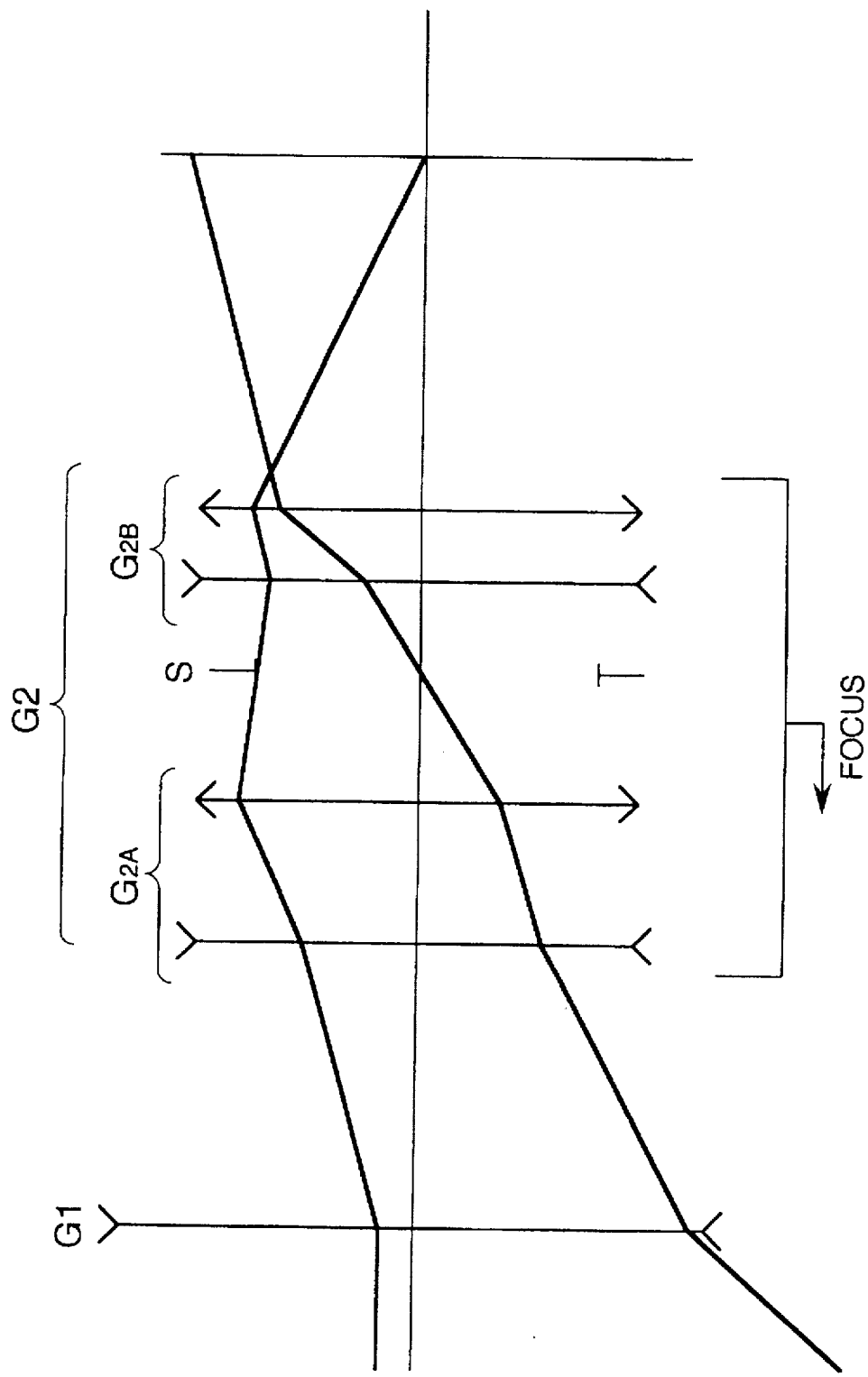
FIG. 1 is a schematic diagram for explaining the operation principle of the present invention.
Figure 2:
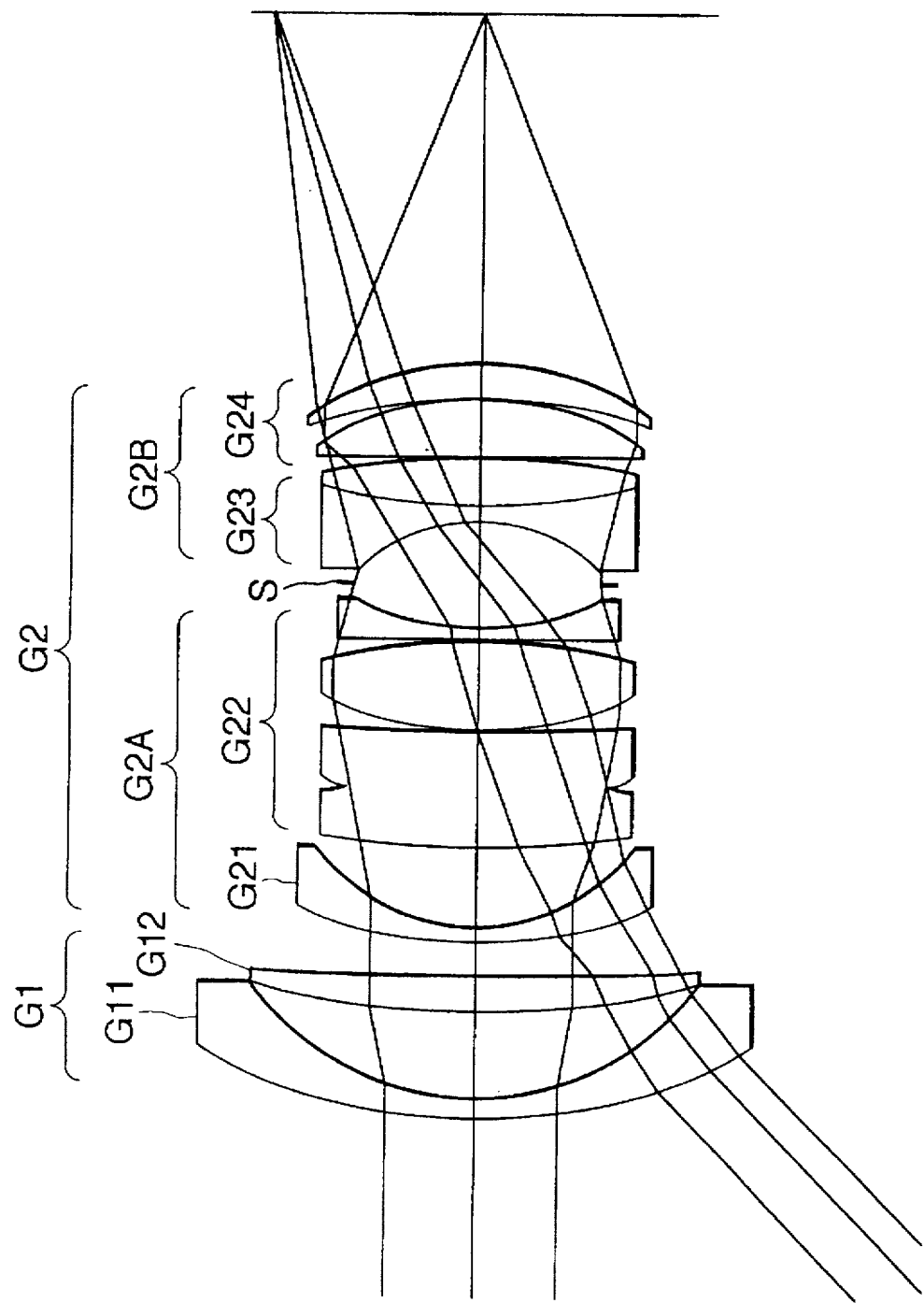
FIG. 2 is a sectional side view showing the structure of a retrofocus type wide-angle lens according to a first preferred embodiment of the present invention.

FIG. 2 shows the structure of a retrofocus type wide-angle lens according to a first preferred embodiment of the present invention. The retrofocus type wide-angle lens of this preferred embodiment has, in the following order from the object side, a first lens group G1 consisting of a negative meniscus lens with a convex surface directed to the object side and a positive meniscus lens with a convex surface directed to the object side, a first unit G21 of a second lens group G2 consisting of a negative meniscus lens with a convex surface directed to the object side, a second unit G22 of the second lens group consisting of a positive meniscus lens with a convex surface directed to the object side, a biconvex lens and a negative meniscus lens with a convex surface directed to the object side, an aperture diaphragm S, a third unit G23 of the second lens group consisting of a cemented lens of a biconcave lens and a biconvex lens forming, as a whole, a negative meniscus lens with a convex surface directed to the image side, and a fourth unit G24 of the second lens group consisting of a positive meniscus lens with a concave surface directed to the object side and a positive meniscus lens with a concave surface directed to the object side.

The following Table 1 shows values of various elements of the first preferred embodiment of the present invention. In the Table 1, f, $F_{NO}$, 2ω and Bf represent the focal length, the F-number, the angle of view and the back focus respectively. Left end figures indicate the order of the respective lens surfaces. r and d represent the radius of curvature of each lens surface and the distance between adjacent lens surfaces respectively. Also, n and ν represents the refractive index with respect to the d-lines (λ=587.6 nm) and the Abbe number with respect to the d-lines (λ=587.6 nm) respectively.

Aspherical surfaces are expressed, when the height in the perpendicular direction to the optical axis is y, an amount of change in the optical axis direction at the height y is S(y), the reference radius of curvature is R, the conic coefficient is k, and the aspherical coefficient $C_n$ of the n-th order, as follows:

expression $$S(y) = (y^2/R)/(1 + (1 - k \cdot y^2/R^2)^{1/2}) + \quad (a)$$
$$C_2 \cdot y^2 + C_4 \cdot y^4 +$$
$$C_6 \cdot y^6 + C_8 \cdot y^8 + C_{10} \cdot y^{10} + \ldots$$

Also, the paraxial radius of curvature r is defined by:

$$r = 1/(2 \cdot C_2 + 1/R). \quad (b)$$

In the Table 1, the aspherical surface is indicated by an asterisk mark affixed on the right side of a surface number.

TABLE 1

| f = 24.7  $F_{NO}$ = 1.44  2ω = 84° | | | |
|---|---|---|---|
| r | d | ν | n |
| 1 | 53.8892 | 2.0000 | 45.37 | 1.79668 |
| 2 | 26.4283 | 9.8000 | | |
| 3 | 78.2844 | 4.0000 | 28.56 | 1.79504 |
| 4 | 316.8005 | (d4 = variable) | | |
| 5 | 42.5003 | 1.7000 | 50.84 | 1.65844 |
| 6* | 18.3650 | 8.6500 | | |
| 7 | 84.3933 | 12.5000 | 64.10 | 1.51680 |
| 8 | 150.7620 | 0.1000 | | |
| 9 | 32.5889 | 10.0000 | 43.35 | 1.84042 |
| 10 | −61.7517 | 0.1000 | | |
| 11 | 429.1414 | 1.5000 | 65.77 | 1.46450 |
| 12 | 30.6780 | 11.7500 | | |
| 13 | −17.7566 | 1.5000 | 23.01 | 1.86074 |
| 14 | 61.7448 | 5.5000 | 39.61 | 1.80454 |
| 15* | −36.7975 | 0.1000 | | |
| 16 | −1632.1520 | 6.5000 | 49.45 | 1.77279 |
| 17 | −29.0900 | 0.1000 | | |
| 18 | −51.6118 | 4.2000 | 53.93 | 1.71300 |
| 19 | −28.5700 | (Bf) | | |

(aspherical surface data)

| | k | $C_2$ | $C_4$ |
|---|---|---|---|
| 6th surface | 0.7000 | 0.0000 | −0.17270 × 10⁻⁵ |
| | $C_6$ | $C_8$ | $C_{10}$ |
| | 0.30052 × 10⁻⁸ | −0.55613 × 10⁻¹⁰ | 0.42494 × 10⁻¹³ |

TABLE 1-continued

| f = 24.7  $F_{NO}$ = 1.44  2ω = 84° | | |
|---|---|---|
| k | $C_2$ | $C_4$ |
| 15th surface  2.0000 | 0.0000 | 0.20226 × 10⁻⁴ |
| $C_6$ | $C_8$ | $C_{10}$ |
| 0.24437 × 10⁻⁷ | 0.15914 × 10⁻¹⁰ | −0.10020 × 10⁻¹² |

(variable distance at the time of varying focal length)

| f and β | 24.7010 | −0.0336 | −0.1313 |
|---|---|---|---|
| D0 | 0.0000 | 716.7127 | 171.1088 |
| d4 | 4.1653 | 3.3181 | 0.8825 |
| Bf | 38.0559 | 38.9094 | 41.4333 |

(values corresponding to conditions)

(1) −f1/f0 = 6.48
(2) f2B/f2A = 0.626
(3) −f1/f2 = 5.26
(4) $f_p$/f2 = 0.877
(5) IAS − SI/f0 = 0.0391
(effective diameter of 15th surface: φ29)
(6) IAS − SI/f0 = 0.0332
(effective diameter of 6th surface: φ20.8)
(7) $q_N$ = −2.52
(8) −$f2_N$/f2 = 1.66
(9) d1/(−f1) = 0.0988

Preferred Embodiment 2

Figure 3:
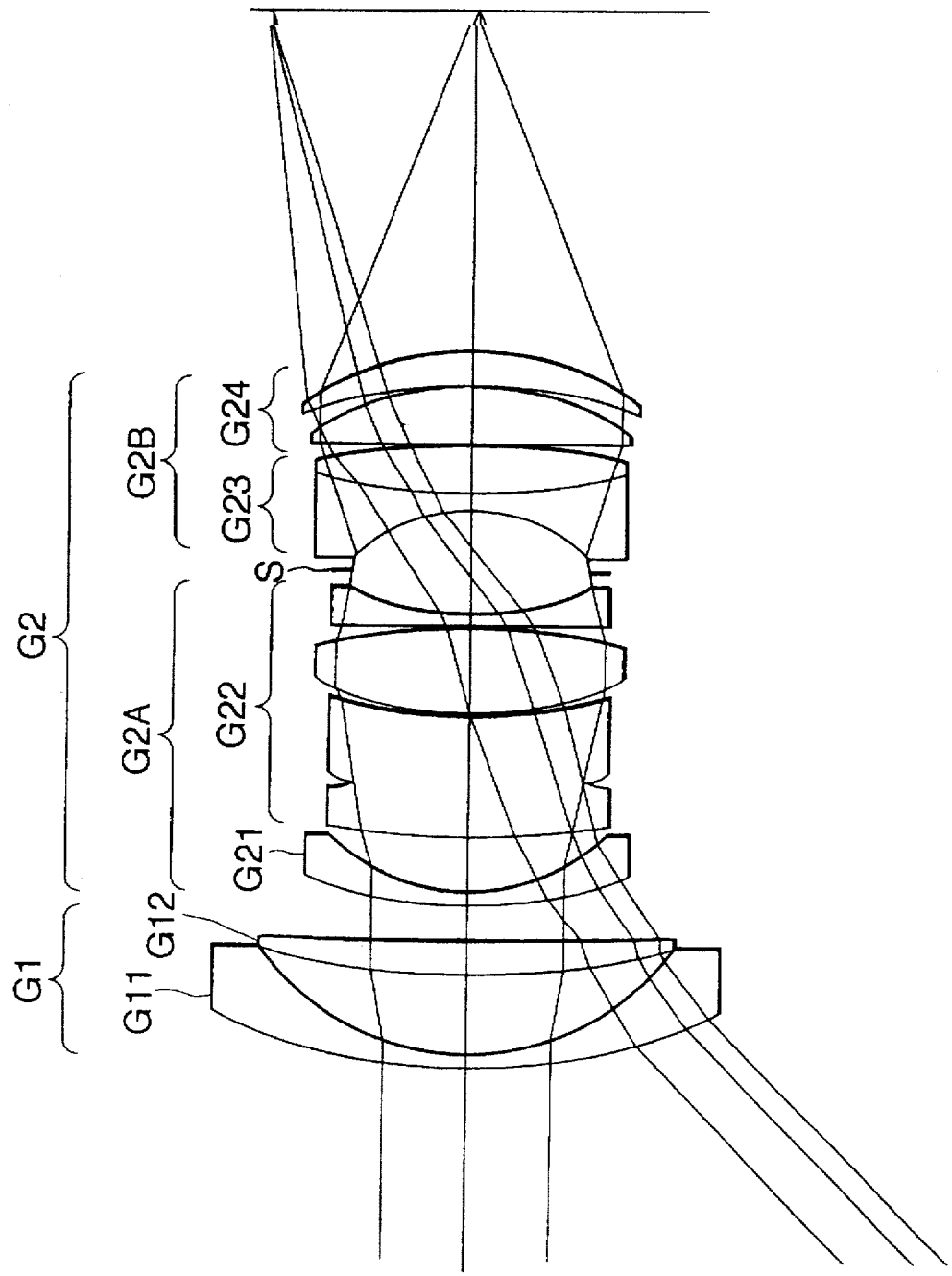
FIG. 3 is a sectional side view showing the structure of a retrofocus type wide-angle lens according to a second preferred embodiment of the present invention.

FIG. 3 shows the structure of a retrofocus type wide-angle lens according to a second preferred embodiment of the present invention. The retrofocus type wide-angle lens of this preferred embodiment has, in the following order from the object side, a first lens group G1 consisting of a negative meniscus lens with a convex surface directed to the object side and a positive meniscus lens with a convex surface directed to the object side, a first unit G21 of a second lens group consisting of a negative meniscus lens with a convex surface directed to the object side, a second unit G22 of the second lens group consisting of a negative meniscus lens with a convex surface directed to the object side, a biconvex lens and a biconcave lens, an aperture diaphragm S, a third unit G23 of the second lens group consisting of a cemented lens of a biconcave lens and a biconvex lens forming, as a whole, a negative meniscus lens with a convex surface directed to the image side, and a fourth unit G24 of the second lens group consisting of a positive meniscus lens with a concave surface directed to the object side and a positive meniscus lens with a concave surface directed to the object side.

Although the basic structure of the retrofocus type wide-angle lens of the second embodiment is the same as that of the retrofocus type wide-angle lens of the first embodiment, the shapes and refracting powers of the respective lens groups are different from those of the lens groups in the first embodiment.

The following Table 2 shows values of various elements of the second preferred embodiment of the present invention. In the Table 2, f, $F_{NO}$, 2ω and Bf represent the focal length, the F-number, the angle of view and the back focus respectively. Left end figures indicate the order of the respective lens surfaces. r and d represent the radius of curvature of each lens surface and the distance between adjacent lens surfaces respectively. Also, n and ν represents the refractive index with respect to the d-lines (λ=587.6 nm) and the Abbe number with respect to the d-lines (λ=587.6 nm) respectively.

TABLE 2

$f = 24.7 \quad F_{NO} = 1.44 \quad 2\omega = 84°$

|  | r | d | ν | n |
|---|---|---|---|---|
| 1 | 51.5712 | 2.0000 | 49.45 | 1.77279 |
| 2 | 25.1944 | 9.0000 | | |
| 3 | 86.8911 | 4.0000 | 33.89 | 1.80384 |
| 4 | 89.8414 | (d4 = variable) | | |
| 5 | 38.0686 | 1.7000 | 53.75 | 1.69350 |
| 6* | 18.3161 | 5.9000 | | |
| 7 | 78.1429 | 14.0000 | 64.10 | 1.51680 |
| 8 | 65.7046 | 0.1000 | | |
| 9 | 30.3334 | 9.2000 | 43.35 | 1.84042 |
| 10 | −54.0038 | 0.1000 | | |
| 11 | −255.4688 | 1.5000 | 65.77 | 1.46450 |
| 12 | 38.7141 | 11.2500 | | |
| 13 | −17.1388 | 1.5000 | 23.01 | 1.86074 |
| 14 | 85.9389 | 5.0000 | 40.90 | 1.79631 |
| 15* | −35.4691 | 0.1000 | | |
| 16 | −643.3219 | 6.7500 | 52.30 | 1.74810 |
| 17 | −26.7136 | 0.0500 | | |
| 18 | −57.3961 | 4.5000 | 53.93 | 1.71300 |
| 19 | −29.1781 | (Bf) | | |

(aspherical surface data)

| | k | $C_2$ | $C_4$ |
|---|---|---|---|
| 6th surface | 1.1127 | 0.0000 | $-0.71339 \times 10^{-5}$ |
| | $C_6$ | $C_8$ | $C_{10}$ |
| | $-0.69080 \times 10^{-7}$ | $-0.27470 \times 10^{-9}$ | $0.13098 \times 10^{-11}$ |
| | k | $C_2$ | $C_4$ |
| 15th surface | 3.0841 | 0.0000 | $0.24916 \times 10^{-4}$ |
| | $C_6$ | $C_8$ | $C_{10}$ |
| | $0.41989 \times 10^{-7}$ | $-0.26002 \times 10^{-10}$ | $0.29292 \times 10^{-13}$ |

(variable distance at the time of varying focal length)

| f and β | 24.7008 | −0.0336 | −0.1296 |
|---|---|---|---|
| D0 | 0.0000 | 716.8762 | 174.8345 |
| d4 | 3.9552 | 3.1049 | 0.7174 |
| Bf | 38.0879 | 38.9459 | 41.4366 |

(values corresponding to conditions)

(1) −f1/f0 = 6.07
(2) f2B/f2A = 0.56
(3) −f1/f2 = 4.96
(4) $f_P$/f2 = 0.804
(5) lAS − SVf0 = 0.0418
(effective diameter of 15th surface: φ28.8)
(6) lAS − SVf0 = 0.0195
(effective diameter of 6th surface: φ27.4)
(7) $q_N$ = −2.85
(8) −f2$_N$/f2 = 1.74
(9) d1/(−f1) = 0.010

Embodiment 3

Figure 4:
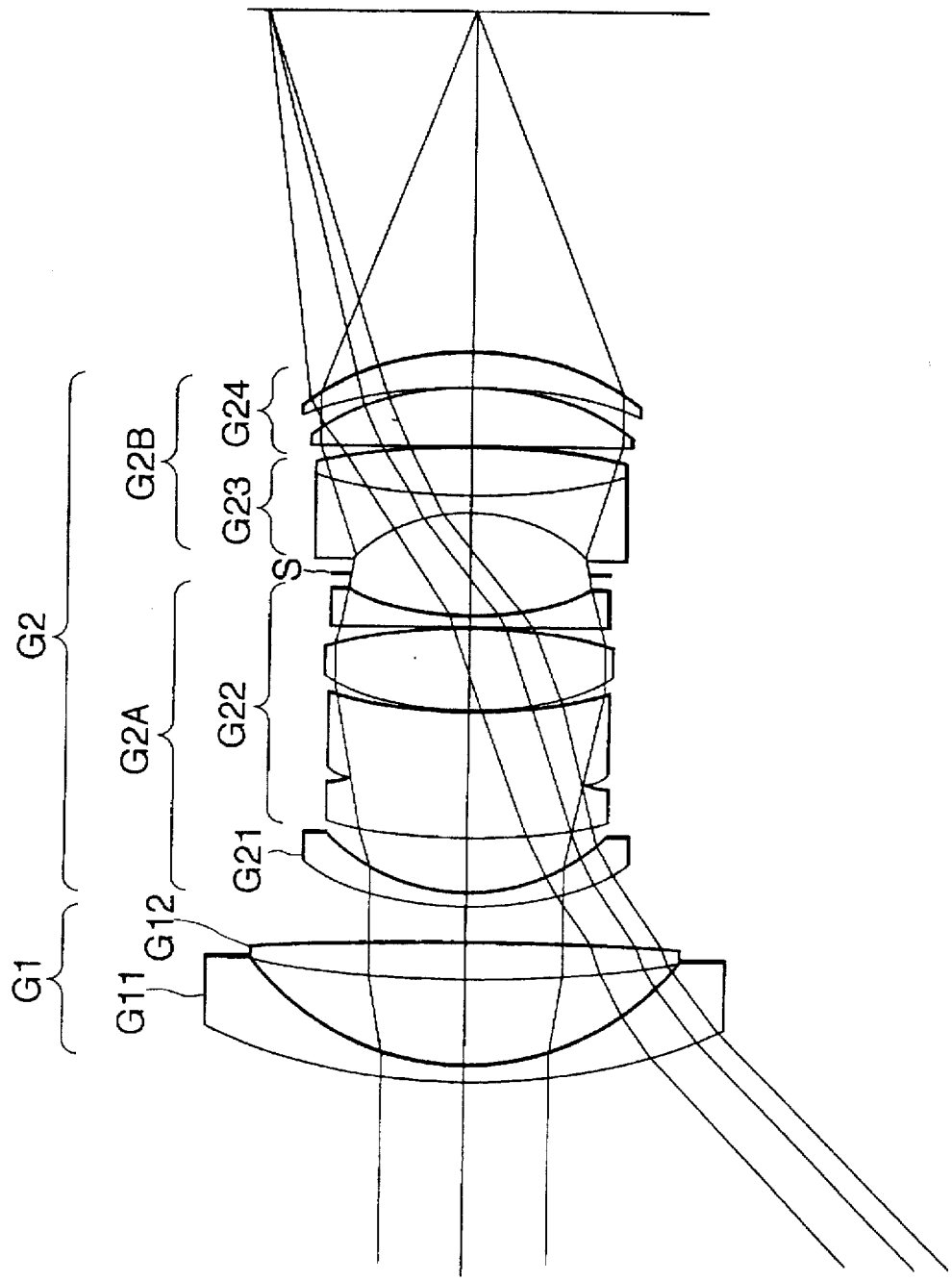
FIG. 4 is a sectional side view showing the structure of a retrofocus type wide-angle lens according to a third preferred embodiment of the present invention.

FIG. 4 shows the structure of a retrofocus type wide-angle lens according to a third preferred embodiment of the present invention. The retrofocus type wide-angle lens of this preferred embodiment has, in the following order from the object side, a first lens group G1 consisting of a negative meniscus lens with a convex surface directed to the object side and a biconvex lens, a first unit G21 of a second lens group consisting of a negative meniscus lens with a convex surface directed to the object side, a second unit G22 of the second lens group consisting of a negative meniscus lens with a convex surface directed to the object side, a biconvex lens and a negative meniscus lens with a convex surface directed to the object side, an aperture diaphragm S, a third unit G23 of the second lens group consisting of a cemented lens of a biconcave lens and a biconvex lens forming, as a whole, a negative meniscus lens with a convex surface directed to the image side, and a fourth unit G24 of the second lens group consisting of a positive meniscus lens with a concave surface directed to the object side and a positive meniscus lens with a concave surface directed to the object side.

Although the basic structure of the retrofocus type wide-angle lens of the third embodiment is the same as that of the retrofocus type wide-angle lens of the first embodiment, the shapes and refracting powers of the respective lens groups are different from those of the lens groups in the first embodiment.

The following Table 3 shows values of various elements of the third preferred embodiment of the present invention. In the Table 3, f, $F_{NO}$, 2ω and Bf represent the focal length, the F-number, the angle of view and the back focus respectively. Left end figures indicate the order of the respective lens surfaces. r and d represent the radius of curvature of each lens surface and the distance between adjacent lens surfaces respectively. Also, n and ν represents the refractive index with respect to the d-lines (λ=587.6 nm) and the Abbe number with respect to the d-lines (λ=587.6 nm) respectively.

TABLE 3

$f = 24.7 \quad F_{NO} = 1.42 \quad 2\omega = 84°$

|  | r | d | ν | n |
|---|---|---|---|---|
| 1 | 60.5552 | 2.0000 | 49.45 | 1.77279 |
| 2 | 26.0329 | 10.0000 | | |
| 3 | 143.5939 | 4.0000 | 33.89 | 1.80384 |
| 4 | −547.5820 | (d4 = variable) | | |
| 5 | 33.7966 | 1.7000 | 53.75 | 1.69350 |
| 6* | 19.7272 | 5.9000 | | |
| 7 | 58.5958 | 14.0000 | 64.10 | 1.51680 |
| 8 | 43.8608 | 0.1000 | | |
| 9 | 29.9451 | 9.2000 | 40.90 | 1.79631 |
| 10 | −51.9722 | 0.1000 | | |
| 11 | 1599.6127 | 1.5000 | 69.98 | 1.51860 |
| 12 | 45.2198 | 11.2500 | | |
| 13 | −16.6289 | 1.5000 | 23.01 | 1.86074 |
| 14 | 46.1684 | 7.0000 | 40.90 | 1.79631 |
| 15* | −34.7946 | 0.1000 | | |
| 16 | −348.5554 | 6.0000 | 45.37 | 1.79668 |
| 17 | −30.4650 | 0.0500 | | |
| 18 | −58.4044 | 4.6000 | 52.30 | 1.74810 |
| 19 | −28.3920 | (Bf) | | |

(aspherical surface data)

| | k | $C_2$ | $C_4$ |
|---|---|---|---|
| 6th surface | 1.2674 | 0.0000 | $-0.72667 \times 10^{-5}$ |
| | $C_6$ | $C_8$ | $C_{10}$ |
| | $-0.70770 \times 10^{-7}$ | $0.26496 \times 10^{-9}$ | $-0.11454 \times 10^{-11}$ |
| | k | $C_2$ | $C_4$ |
| 15th surface | 2.9826 | 0.0000 | $0.21325 \times 10^{-4}$ |
| | $C_6$ | $C_8$ | $C_{10}$ |
| | $0.36943 \times 10^{-7}$ | $-0.17325 \times 10^{-10}$ | $0.66039 \times 10^{-13}$ |

(variable distance at the time of varying focal length)

| f and β | 24.7008 | −0.0335 | −0.1362 |
|---|---|---|---|
| D0 | 0.0000 | 718.3334 | 165.0567 |

TABLE 3-continued $f = 24.7 \quad F_{NO} = 1.42 \quad 2\omega = 84°$

| d4 | 4.3792 | 3.5144 | 0.8728 |
|---|---|---|---|
| Bf | 38.0585 | 38.9286 | 41.6509 |

(values corresponding to conditions)

(1) $-f1/f0 = -4.86$
(2) $f2B/f2A = 0.625$
(3) $-f1/f2 = 3.70$
(4) $f_P/f2 = 0.774$
(5) IAS $-SI/f0 = 0.03616$
(effective diameter of 15th surface: $\phi 29.1$)
(6) IAS $-SI/f0 = 0.01665$
(effective diameter of 6th surface: $\phi 28.4$)
(7) $q_N = -3.80$
(8) $-f2_N/f2 = 2.22$
(9) $d1/(-f1) = 0.133$ Embodiment 4

Figure 5:
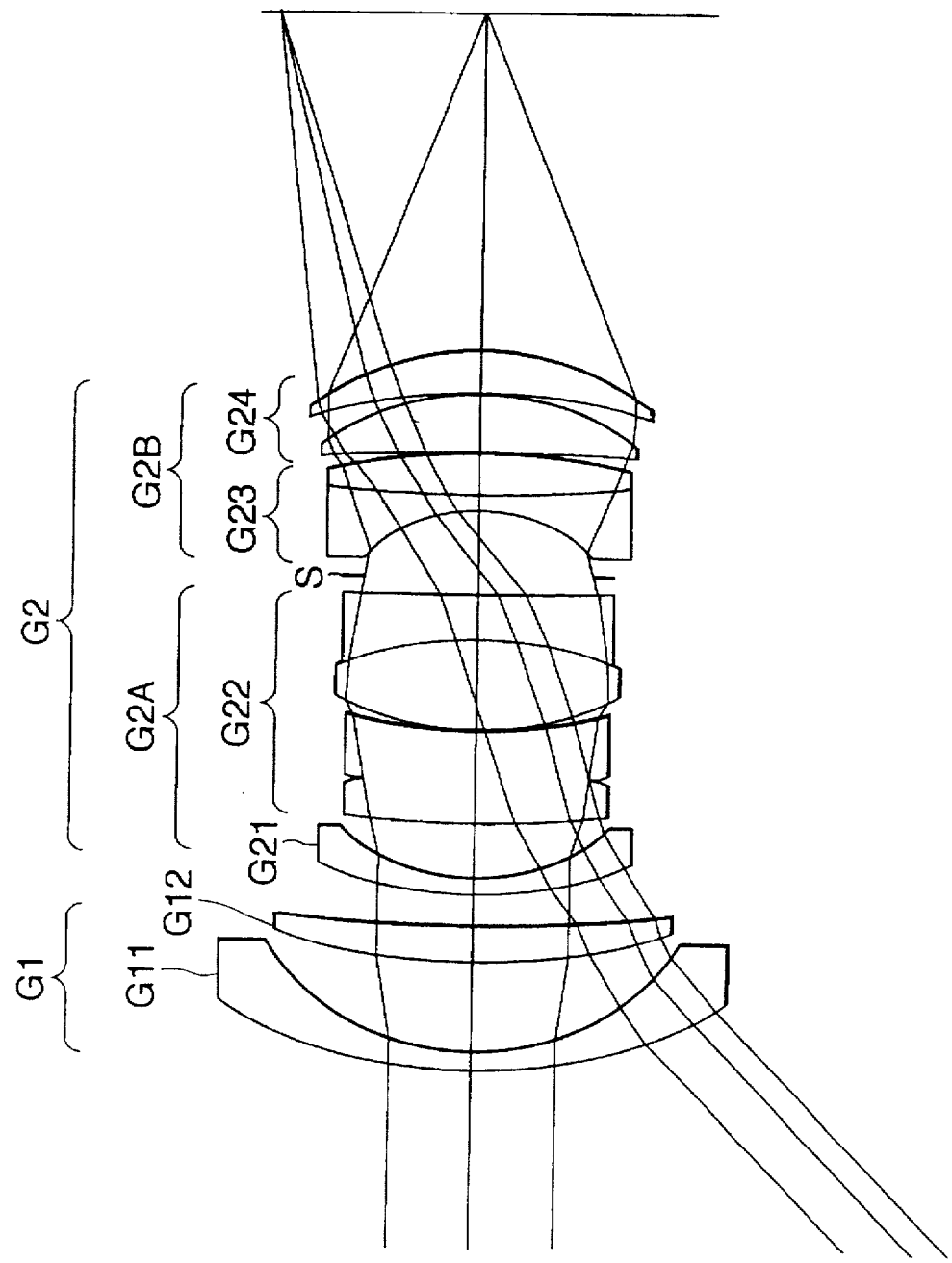
FIG. 5 is a sectional side view showing the structure of a fourth preferred embodiment of the present invention.

FIG. 5 shows the structure of a retrofocus type wide-angle lens according to a fourth preferred embodiment of the present invention. The retrofocus type wide-angle lens of this embodiment has, in the following order from the object side, a first lens group G1 consisting of a negative meniscus lens with a convex surface directed to the object side and a positive meniscus lens with a convex surface directed to the object side; a first unit G21 of the second lens group consisting of a negative meniscus lens with a convex surface directed to the object side, a second unit G22 of the second lens group consisting of a negative meniscus lens with a convex surface directed to the object side and a cemented lens of a biconvex lens and a biconcave lens constituting, as a whole, a positive meniscus lens with a convex surface directed to the object side, an aperture diaphragm S, a third unit G23 of the second lens group consisting of a cemented lens of a biconcave lens and a biconvex lens constituting, as a whole, a negative meniscus lens with a convex surface directed to the image side, and a fourth unit G24 of the second lens group consisting of a positive meniscus lens with a concave surface directed to the object side and a positive meniscus lens with a concave surface directed to the object side.

Although the basic structure of the retrofocus type wide-angle lens of the fourth embodiment is the same as that of the retrofocus type wide-angle lens of the first embodiment, the shapes and refracting powers of the respective lens groups are different from those of the lens groups in the first embodiment.

The following Table 4 shows values of various elements of the fourth preferred embodiment of the present invention. In the Table 4, f, $F_{NO}$, 2ω and Bf represent the focal length, the F-number, the angle of view and the back focus respectively. Left end figures indicate the order of the respective lens surfaces. r and d represent the radius of curvature of each lens surface and the distance between adjacent lens surfaces respectively. Also, n and ν represents the refractive index with respect to the d-lines (λ=587.6 nm) and the Abbe number with respect to the d-lines (λ=587.6 nm) respectively.

TABLE 4

$f = 24.7 \quad F_{NO} = 1.43 \quad 2\omega = 84°$

|  | r | d | ν | n |
|---|---|---|---|---|
| 1 | 46.5738 | 2.0000 | 49.45 | 1.77279 |
| 2 | 24.3546 | 10.4557 |  |  |
| 3 | 63.6858 | 4.0000 | 33.89 | 1.80384 |
| 4 | 141.8001 | (d4 = variable) |  |  |
| 5 | 37.9726 | 1.7000 | 53.72 | 1.69350 |
| 6* | 18.6811 | 6.1344 |  |  |
| 7 | 109.6332 | 10.0000 | 64.10 | 1.51680 |
| 8 | 50.3712 | 0.1000 |  |  |
| 9 | 28.3946 | 10.0000 | 43.35 | 1.84042 |
| 10 | -41.4055 | 5.0000 | 61.09 | 1.58913 |
| 11 | 191.8857 | 10.0000 |  |  |
| 12 | -17.1388 | 1.5000 | 23.01 | 1.86074 |
| 13 | 120.7003 | 4.5000 | 40.90 | 1.79631 |
| 14* | -35.7522 | 0.1000 |  |  |
| 15 | -367.6290 | 6.5000 | 52.30 | 1.74810 |
| 16 | -26.6210 | 0.0500 |  |  |
| 17 | -61.3511 | 5.0000 | 53.93 | 1.71300 |
| 18 | -27.8327 | (Bf) |  |  |

(aspherical surface data)

|  | k | $C_2$ | $C_4$ |
|---|---|---|---|
| 6th surface | 1.1588 | 0.0000 | $-0.10093 \times 10^{-4}$ |

|  | $C_6$ | $C_8$ | $C_{10}$ |
|---|---|---|---|
|  | $-0.79479 \times 10^{-7}$ | $0.24180 \times 10^{-9}$ | $-0.13534 \times 10^{-11}$ |

|  | k | $C_2$ | $C_4$ |
|---|---|---|---|
| 14th surface | 2.9622 | 0.0000 | $0.26082 \times 10^{-4}$ |

|  | $C_6$ | $C_8$ | $C_{10}$ |
|---|---|---|---|
|  | $0.43966 \times 10^{-7}$ | $-0.37737 \times 10^{-10}$ | $-0.13849 \times 10^{-13}$ |

(variable distance at the time of varying focal length)

| f and β | 24.7000 | -0.0336 | -0.1291 |
|---|---|---|---|
| D0 | 0.0000 | 716.8762 | 174.8345 |
| d4 | 3.9002 | 3.0499 | 0.6624 |
| Bf | 37.9282 | 38.7853 | 41.2639 |

(values corresponding to conditions)

(1) $-f1/f0 = 6.07$
(2) $f2B/f2A = 0.50$
(3) $-f1/f2 = 4.96$
(4) $f_P/f2 = 0.709$
(5) IAS $-SI/f0 = 0.0446$
(effective diameter of 14th surface: $\phi 28.8$)
(6) IAS $-SI/f0 = 0.0238$
(effective diameter of 6th surface: $\phi 26.9$)
(7) $q_N = -2.94$
(8) $-f2_N/f2 = 1.82$
(9) $d1/(-f1) = 0.110$ Preferred Embodiment 5

Figure 6:
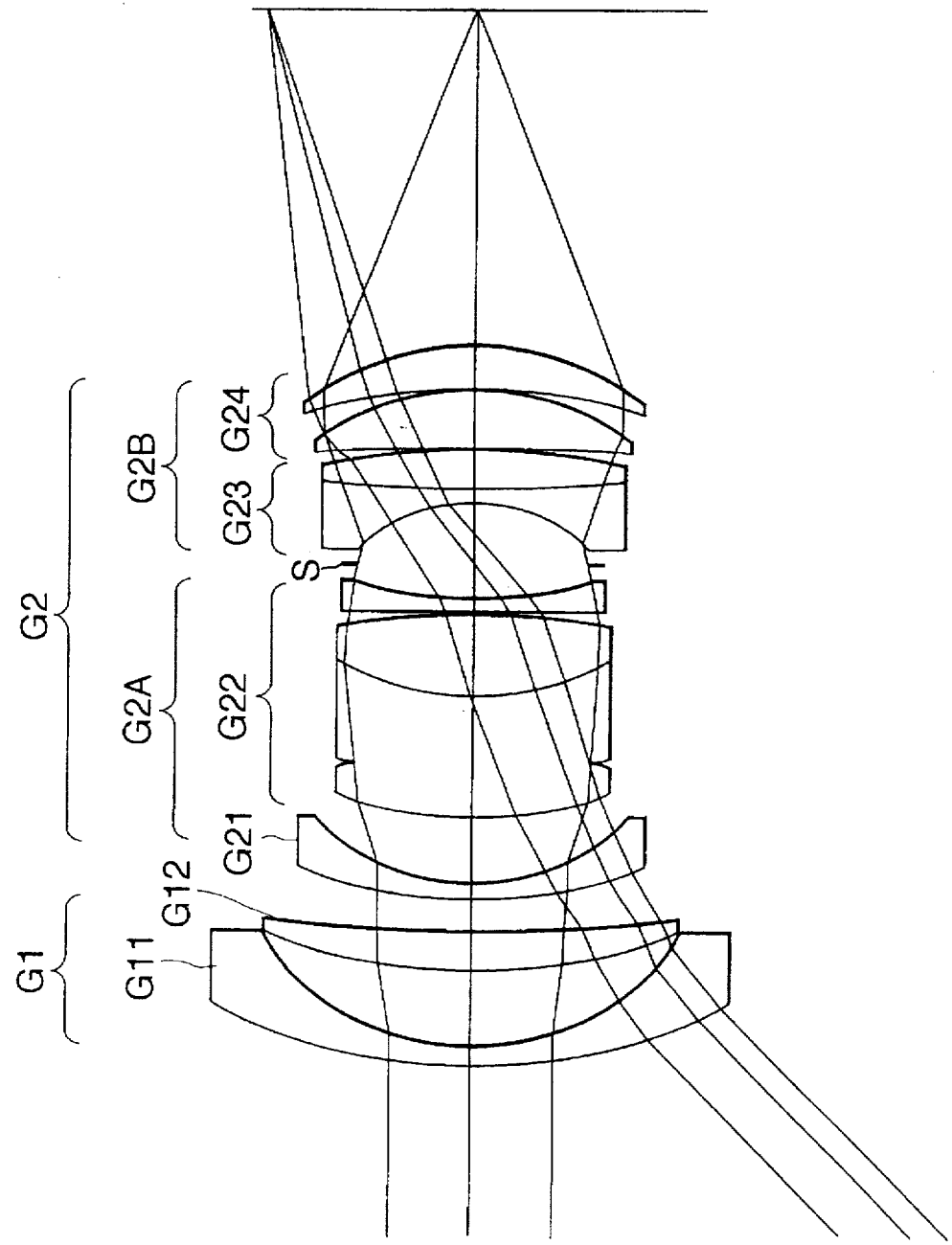
FIG. 6 is a sectional side view showing the structure of a fifth preferred embodiment of the present invention.

FIG. 6 shows the structure of a retrofocus type wide-angle lens according to a fifth preferred embodiment of the present invention. The retrofocus type wide-angle lens of this embodiment has, in the following order from the object side, a first lens group G1 consisting of a negative meniscus lens with a convex surface directed to the object side and a positive meniscus lens with a convex surface directed to the object side, a first unit G21 of a second lens group consisting of a negative meniscus lens with a convex surface directed to the object side, a second unit G22 of the second lens group consisting of a cemented lens of a negative meniscus lens with a convex surface directed to the object side and a biconvex lens constituting, as a whole, a biconvex cemented lens and a negative meniscus lens with a convex surface directed to the object side, an aperture diaphragm S, a third unit G23 of the second lens group consisting of a cemented lens of a biconcave lens and a biconvex lens constituting, as a whole, a negative meniscus lens with a convex surface directed to the image side, and a fourth unit G24 of the second lens group consisting of a positive meniscus lens with a concave surface directed to the object side and a positive meniscus lens with a concave surface directed to the object side.

Although the basic structure of the retrofocus type wide-angle lens of the fifth embodiment is the same as that of the retrofocus type wide-angle lens of the first embodiment, the shapes and refracting powers of the respective lens groups are different from those of the lens groups in the first embodiment.

The following Table 5 shows values of various elements of the fifth preferred embodiment of the present invention. In the Table 5, f, $F_{NO}$, 2ω and Bf represent the focal length, the F-number, the angle of view and the back focus respectively. Left end figures indicate the order of the respective lens surfaces. r and d represent the radius of curvature of each lens surface and the distance between adjacent lens surfaces respectively. Also, n and v represents the refractive index with respect to the d-lines (λ=587.6 nm) and the Abbe number with respect to the d-lines (λ=587.6 nm) respectively.

TABLE 5 f = 24.7   $F_{NO}$ = 1.44   2ω = 84°

|   | r | d | v | n |
|---|---|---|---|---|
| 1 | 52.4425 | 2.0000 | 49.45 | 1.77279 |
| 2 | 24.8438 | 9.0000 | | |
| 3 | 58.3318 | 4.0000 | 33.89 | 1.80384 |
| 4 | 143.0601 | (d4 = variable) | | |
| 5 | 45.9683 | 1.7000 | 53.75 | 1.69350 |
| 6* | 18.7862 | 7.6382 | | |
| 7 | 35.0831 | 14.0000 | 64.10 | 1.51680 |
| 8 | 24.1314 | 9.2000 | 43.35 | 1.84042 |
| 9 | −86.9583 | 0.1000 | | |
| 10 | 228.8726 | 1.5000 | 65.77 | 1.46450 |
| 11 | 45.2843 | 11.2500 | | |
| 12 | −17.9486 | 1.5000 | 23.01 | 1.86074 |
| 13 | 92.0102 | 4.7000 | 40.90 | 1.79631 |
| 14* | −36.4990 | 0.1000 | | |
| 15 | −341.2686 | 6.0000 | 52.30 | 1.74810 |
| 16 | −28.5847 | 0.0500 | | |
| 17 | −68.7799 | 5.0000 | 53.93 | 1.71300 |
| 18 | −28.1497 | (Bf) | | |

(aspherical surface data)

|  | k | $C_2$ | $C_4$ |
|---|---|---|---|
| 6th surface | 1.0556 | 0.0000 | −0.90900 × $10^{-5}$ |

|  | $C_6$ | $C_8$ | $C_{10}$ |
|---|---|---|---|
|  | −0.70915 × $10^{-7}$ | 0.22572 × $10^{-9}$ | −0.10047 × $10^{-11}$ |

|  | k | $C_2$ | $C_4$ |
|---|---|---|---|
| 15th surface | 3.5739 | 0.0000 | 0.23960 × $10^{-4}$ |

|  | $C_6$ | $C_8$ | $C_{10}$ |
|---|---|---|---|
|  | 0.44206 × $10^{-7}$ | −0.52696 × $10^{-10}$ | 0.13795 × $10^{-12}$ |

TABLE 5-continued f = 24.7   $F_{NO}$ = 1.44   2ω = 84°

(variable distance at the time of varying focal length)

| f and β | 24.7009 | −0.0336 | −0.1294 |
|---|---|---|---|
| D0 | 0.0000 | 716.8762 | 174.8345 |
| d4 | 3.7539 | 2.9035 | 0.5160 |
| Bf | 37.8953 | 38.7530 | 41.2381 |

(values corresponding to conditions)

(1) −f1/f0 = 6.07
(2) f2B/f2A = 0.511
(3) −f1/f2 = 4.96
(4) $f_p$/f2 = 0.772
(5) lAS − S/f0 = 0.0379
(effective diameter of 14th surface: φ28.8)
(6) lAS − S/f0 = 0.0406
(effective diameter of 6th surface: φ29.4)
(7) $q_N$ = −2.38
(8) −$f2_N$/f2 = 1.55
(9) d1/(−f1) = 0.1

In the above first to fifth preferred embodiments, the aperture diaphragm S is positioned between the front lens group G2A and the rear lens group G2B, but may be provided in any position in the front lens group G2A or the rear lens group G2B.

Also, in the above first to fifth preferred embodiments, the focusing of about β=−⅛ times is possible, as is apparent from the space between the first lens group G1 and the second lens group G2 shown in the tables.

As described above, preferred according to each of the above embodiments, it is possible to obtain a retrofocus type wide-angle lens with a rear focusing system which has a larger aperture (F-number=F1.4) and a large angle of view of 2ω=84° and in which especially the sagittal coma flare is reduced, the spherical aberration and the coma are corrected preferably, and changes in aberrations within a close distance are small.

What is claimed is:

1. A wide-angle lens comprising in the following order from the object side:

a first lens group having a negative refracting power and being fixed in a focusing operation; and a second lens group having a positive refracting power and being moved in the focusing operation, said first lens group comprising a first unit with a negative refracting power and a second unit with a positive refracting power in that order from the object side, said second lens group comprising a first unit with a negative refracting power, a second unit with a positive refracting power, a third unit with a negative refracting power and a fourth unit with a positive refracting power, said third unit of said second lens group comprising a cemented lens formed of a lens with a negative refracting power and a lens with a positive refracting power, said cemented lens forming a negative meniscus lens with a convex surface directed to the image side, wherein the following conditions are satisfied:

2≤f1/f0≤9,

3≤−f1/f2≤9,

0<f2B/f2A≤0.9, wherein, f0 is a focal length of a lens system including said first and second lens groups, f1 is the focal length of said first lens group, f2 is a focal length of said second lens group, f2A is a composite focal length of said first unit of said second lens group and said second unit of said second lens group, f2B is a composite focal length of said third unit of said second lens group and said fourth unit of said second lens group.

2. A wide-angle lens according to claim 1, wherein said second unit of said second lens group comprises a biconvex lens and a negative lens and the following condition is satisfied:

$$0.3 \leq f_P/f2 \leq 1.2,$$

wherein $f_P$ is a focal length of said biconvex lens.

3. A wide-angle lens according to claim 2, wherein said second lens group has an aperture diaphragm, at least one lens surface located on the image side with respect to said aperture diaphragm is aspherical, a shape of said aspherical surface is set such that a positive refracting power is reduced from the center of a lens toward a periphery of said lens or a negative refracting power is increased from the center of said lens toward the periphery of said lens, and the following condition is satisfied:

$$0 < |AS_I - S_I|/f0 < 0.15,$$

wherein, $AS_I$ is an aspherical surface distance, of an aspherical surface positioned on the image side with respect to said aperture diaphragm, from a plane perpendicular to an optical axis of the lens system at an intersecting point of the aspherical surface with the optical axis to an outermost periphery of effective diameter of the aspherical surface, $S_I$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface, $|AS_I - S_I|$ is an amount of sag being an amount of a difference between said $AS_I$ and said $S_I$ in a direction of an optical axis of the lens system, f0 is the focal length of the whole lens system.

4. A wide-angle lens according to claim 3, wherein at least one lens surface located on the object side with respect to said aperture diaphragm is aspherical and the following condition is satisfied:

$$0 < |AS_o - S_o|/f0 < 0.2,$$

wherein, $AS_o$ is an aspherical surface distance, of an aspherical surface positioned on the object side with respect to said aperture diaphragm, from a plane perpendicular to an optical axis of the lens system at an intersecting point of the aspherical surface with the optical axis to an outermost periphery of effective diameter of the aspherical surface, $S_o$ is a reference spherical surface distance, of a reference spherical surface having a predetermined apex curvature radius, from a plane perpendicular to an optical axis of the lens system at an intersecting point of the reference spherical surface with the optical axis of an outermost periphery of effective diameter of the reference spherical surface, $|AS_o - S_o|$ is an amount of sag being an amount of a difference between said $AS_o$ and said $S_o$ in the optical direction, f0 is the focal length of the whole lens system.

5. A wide-angle lens according to claim 4, wherein said first unit of said second lens group comprises at least a negative lens provided closest to the object side and the following condition is satisfied:

$$-8 \leq q_n \leq -1$$

$$q_n = (r_B + r_A)/(r_B - r_A),$$

wherein $q_N$ is a shape factor of said negative lens of said second lens group provided closest to the object side, $r_B$ is radius of curvature of a surface of said negative lens of said second lens group located on the object side, $r_A$ is a radius curvature of a surface of said negative lens of said first unit located on the image side.

6. A wide-angle lens according to claim 5, wherein the following condition is satisfied:

$$0.1 \leq -f2_N/f2 \leq 5,$$

wherein $f2_N$ is a focal length of said negative lens of said second lens group disposed closest to the object side.

7. A wide-angle lens according to claim 6, wherein the following condition is satisfied:

$$0.01 \leq d1/(-f1) \leq 0.3,$$

wherein d1 is a distance from a lens surface of said first lens group located closest to the object side to a lens surface of said first lens group located closest to the image side on the optical axis.

8. A wide-angle lens, comprising in the following order from the object side:

a first lens group having a negative refracting power and being fixed in a focusing operation; and a second lens group having a positive refracting power and being moved in the focusing operation, said first lens group comprising a first unit with a negative refracting power and a second unit with a positive refracting power in that order from the object side, said second lens group comprising a first unit with a negative refracting power, a second unit with a positive refracting power, a third unit with a negative refracting power and a fourth unit with a positive refracting power, said third unit of said second lens group comprising a cemented lens formed of a lens with a negative refracting power and a lens with a positive refracting power, said cemented lens forming a negative meniscus lens with a convex surface directed to the image side, wherein the following conditions are satisfied:

$$3 \leq -f1/f2 \leq 9,$$

$0 < f2B/f2A < 0.9$, wherein f1 is a focal length of said first lens group, f2 is a focal length of said second lens group f2A is a composite focal length of said first unit of said second lens group and said second unit of said second lens group, f2B is a composite focal length of said third unit of said second lens group and said fourth unit of said second lens group.

9. A wide-angle lens comprising in the following order from the object side:

a first lens group having a negative refracting power and being fixed in a focusing operation; and a second lens group having a positive refracting power and being moved in the focusing operation, said first lens group comprising a first unit with a negative refracting power and a second unit with a positive refracting power in that order from the object side, said second lens group comprising a first unit with a negative refracting power, a second unit with a positive refracting power, a third unit with a negative refracting power, a fourth unit with a positive refracting power, and an aperture diaphragm, said third unit of said second lens group comprising a cemented lens formed of a lens with a negative refracting power and a lens with a positive refracting power, said cemented lens forming a negative meniscus lens with a convex surface directed to the image side, wherein at least one lens surface located on the image side with respect to said aperture diaphragm is aspherical, a shape of said at least one aspherical surface is set such that a positive refracting power is reduced from the center of a lens including said aspherical surface toward a periphery of said lens including said aspherical surface or a negative refracting power is increased from the center of said lens including said aspherical surface toward the periphery of said lens including said aspherical surface, and the following conditions are satisfied:

$0 < f2B/f2A < 0.9$, $0 < |AS_I - S_I|/f0 < 0.15$, wherein, f2A is a composite focal length of said first unit of said second lens group and said second unit of said second lens group, f2B is a composite focal length of said third unit of said second lens group and said fourth unit of said second lens group, $AS_I$ is an aspherical surface distance, of an aspherical surface positioned on the image side with respect to said aperture diaphragm, from a plane perpendicular to an optical axis of the lens system at an intersecting point of the aspherical surface with the optical axis to an outermost periphery of effective diameter of the aspherical surface, $S_I$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface, $|AS_I - S_I|$ is an amount of sag being an amount of a difference between said $AS_I$ and said $S_I$ in a direction of an optical axis of the lens system, f0 is the focal length of the whole lens system.

10. A wide-angle lens comprising in the following order from the object side:

a first lens group having a negative refracting power and being fixed in a focusing operation; and a second lens group having a positive refracting power and being moved in the focusing operation, said first lens group comprising a first unit with a negative refracting power and a second unit with a positive refracting power in that order from the object side, said second lens group comprising a first unit with a negative refracting power, a second unit with a positive refracting power, a third unit with a negative refracting power, a fourth unit with a positive refracting power, and an aperture diaphragm, said third unit of said second lens group comprising a cemented lens formed of a lens with a negative refracting power and a lens with a positive refracting power, said cemented lens forming a negative meniscus lens with a convex surface directed to the image side, wherein at least one lens surface located on the object side with respect to said aperture diaphragm is aspherical and the following conditions are satisfied:

$0 < f2B/f2A < 0.9$, $0 < |AS_o - S_o|/f0 < 0.2$, wherein, f2A is a composite focal length of said first unit of said second lens group and said second unit of said second lens group, f2B is a composite focal length of said third unit of said second lens group and said fourth unit of said second lens group, $AS_o$ is an aspherical surface distance, of an aspherical surface positioned on the object side with respect to said aperture diaphragm, from a plane perpendicular to an optical axis of the lens system at an intersecting point of the aspherical surface with the optical axis to an outermost periphery of an effective diameter of the aspherical surface, $S_o$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface, $|AS_o - S_o|$ is an amount of sag being an amount of a difference between said $AS_o$ and said $S_o$ in a direction of an optical axis of the lens system, f0 is the focal length of the whole lens system.

11. A wide-angle lens comprising:

a first lens group having a negative refracting power with a plurality of lenses and being fixed in a focusing operation; and a second lens group having a positive refracting power and being moved in the focusing operation, said second lens group having an aperture diaphragm and a plurality of lenses, in the following order from the object side, a first unit with a negative refracting power, a third unit with a negative refracting power and a fourth unit with a positive refracting power, at least one of plural lens surfaces located on the object side with respect to said aperture diaphragm being aspherical, at least one of plural lens surfaces located on the image side with respect to said aperture diaphragm being aspherical.

12. A wide-angle lens according to claim 11, wherein said shape of said at least one aspherical surface disposed on the image side of said aperture diaphragm, is set such that a positive refracting power is reduced from a center of a lens including said aspherical surface toward a periphery of said lens including said aspherical surface or a negative refracting power is increased from the center of said lens including said aspherical surface toward the periphery of said lens including said aspherical surface, and the following condition is satisfied:

$$0<|AS_I-S_I|/f0<0.15,$$

$$0<|AS_o-S_o|/f0<0.2,$$

wherein,

AS$_I$ is an aspherical surface distance, of an aspherical surface positioned on the image side with respect to said aperture diaphragm, from a plane perpendicular to an optical axis of the lens system at an intersecting point of the aspherical surface with the optical axis to an outermost periphery of effective diameter of the aspherical surface, S$_I$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface,

|AS$_I$-S$_I$| is an amount of sag being an amount of a difference between said AS$_I$ and said S$_I$ in a direction of an optical axis of the lens system, AS$_o$ is an aspherical surface distance, of an aspherical surface positioned on the object side with respect to said aperture diaphragm, from a plane perpendicular to an optical axis of the lens system at an intersecting point of the aspherical surface with the optical axis to an outermost periphery of an effective diameter of the aspherical surface, S$_o$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface,

|AS$_o$-S$_o$| is an amount of sag being an amount of a difference between said AS$_o$ and said S$_o$ in a direction of an optical axis of the lens system, F0 is the focal length of the whole lens system.

13. A wide-angle lens according to claim 12, wherein the following condition is satisfied:

$$2 \leq -f1/f0 \leq 9$$

$$0 < f2B/f2A < 0.9,$$

wherein f1 is a focal length of said first lens group, f0: a focal length of the whole lens system, f2A is a composite focal length of said first unit of said second lens group and said second unit of said second lens group, f2B is a composite focal length of said third unit of said second lens group and said fourth unit of said second lens group.

14. A wide-angle lens consisting of in the following order from the object side:

a first lens group having a negative refracting power and being fixed in a focusing operation; and a second lens group having a positive refracting power and being moved in the focusing operation, said first lens group comprising a first unit with a negative refracting power and a second unit with a positive refracting power in that order from the objective side, said second lens group comprising a first unit with a negative refracting power, a second unit with a positive refracting power, a third unit with a negative refracting power and a fourth unit with a positive refracting power, said third unit of said second lens group comprising a cemented lens formed of a lens with a negative refracting power and a lens with a positive refracting power, and said cemented lens forming a negative meniscus lens with a convex surface directed to the image side.

15. A wide-angle lens according to claim 14, wherein the following condition is satisfied:

$$2 \leq -f1/f0 \leq 9,$$

wherein, f1 is the focal length of said first lens group;

f0 is a focal length of the whole wide-angle lens system.

16. A wide-angle lens according to claim 15, wherein the following condition is satisfied:

$$0 < f2B/f2A < 0.9,$$

wherein, f2A is a composite focal length of said first unit of said second lens group and said second unit of said second lens group, f2B is a composite focal length of said third unit of said second lens group and said fourth unit of said second lens group.

17. A wide-angle lens according to claim 16, wherein the following condition is satisfied:

$$3 \leq -f1/f2 \leq 9,$$

wherein, f2 is a focal length of said second lens group.

18. A wide-angle lens according to claim 17, wherein said second unit of said second lens group comprises a bi-convex positive lens and a negative lens, and the following condition is satisfied:

$$0.3 \leq f_P/f2 \leq 1.2$$

wherein, f$_P$ is a focal length of said bi-convex positive lens.

19. A wide-angle lens according to claim 18, wherein said second lens group has an aperture diaphragm, at least one lens surface located on the image side with respect to said aperture diaphragm is aspherical, a shape of said aspherical surface is set such that a positive refracting power is reduced from the center of a lens toward a periphery of said lens or a negative refracting power is increased from the center of said lens toward the periphery of said lens, and the following condition is satisfied:

$$0<|AS_I-S_I|/f0<0.15,$$

wherein, $AS_I$ is an aspherical surface distance, of an aspherical surface positioned on the image side with respect to said aperture diaphragm, from a plane perpendicular to an optical axis of the lens system at an intersecting point of the aspherical surface with the optical axis to an outermost periphery of effective diameter of the aspherical surface, $S_I$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface, $|AS_I-S_I|$ is an amount of sag being an amount of a difference between said $AS_I$ and said $S_I$ in a direction of an optical axis of the lens system.

20. A wide-angle lens according to claim 19, wherein at least one lens surface located on the object side with respect to said aperture diaphragm is aspherical and the following condition is satisfied:

$$0<|AS_o-S_o|/f0<0.2$$

wherein, $AS_o$ is an aspherical surface distance, of an aspherical surface positioned on the object side with respect to said aperture diaphragm, from a plane perpendicular to an optical axis of the lens system at an intersecting point of the aspherical surface with the optical axis to an outermost periphery of an effective diameter of the aspherical surface, $S_o$ is a reference spherical surface distance, of a reference aspherical surface having a predetermined apex curvature radius, from a plane perpendicular to an optical axis of the lens system at an intersecting point of the reference spherical surface with the optical axis of an outermost periphery of effective diameter of the reference spherical surface, $|AS_o-S_o|$ is an amount of sag being an amount of a difference between said $AS_o$ and said $S_o$ in a direction of an optical axis of the lens system.

21. A wide-angle lens according to claim 20, wherein said first unit of said second lens group comprises at least a negative lens provided closest to the object side and the following condition is satisfied:

$$-8 \leq q_N \leq -1$$

$$q_N = (r_B + r_A)/(r_B - r_A),$$

wherein, $q_N$ is a shape factor of said negative lens of said second lens group provided closest to the object side, $r_A$ is radius of curvature of a surface of said negative lens of said second lens group located on the object side, and $r_B$ is a radius curvature of a surface of said negative lens of said second lens group on the image side.

22. A wide-angle lens according to claim 21, wherein the following condition is satisfied:

$$0.1 \leq -f2N/f2 \leq 5,$$

wherein, f2N is a focal length of a negative lens of the second lens group located on the most object side.

23. A wide-angle lens according to claim 22, wherein the following condition is satisfied:

$$0.01 \leq d_1/(-f1)<0.3,$$

wherein, $d_1$ is a distance along the optical axis from a lens surface of the first lens group located on the most objective side to a lens surface of the first lens group located on the most objective side.

* * * * *

UNITED STATES PATENT AND TRADEMARK OFFICE
CERTIFICATE OF CORRECTION

PATENT NO. : 5,631,780
DATED : May 20, 1997
INVENTOR(S) : Haru SATO

It is certified that error appears in the above-identified patent and that said Letters Patent is hereby corrected as shown below:

Column 24
    Line 2 (claim 13), "f0:" should be --f0 is--.

Signed and Sealed this

Sixteenth Day of September, 1997

Attest:

BRUCE LEHMAN

Attesting Officer        Commissioner of Patents and Trademarks